(12) United States Patent
Hampapur et al.

(10) Patent No.: US 9,111,237 B2
(45) Date of Patent: Aug. 18, 2015

(54) EVALUATING AN EFFECTIVENESS OF A MONITORING SYSTEM

(75) Inventors: Arun Hampapur, Norwalk, CT (US); William D. Pfelfer, Jr., Ketchlkan, AK (US); Bemice E. Rogowitz, Ossining, NY (US); Mercan Topkara, Thornwood, NY (US)

(73) Assignee: International Business Machines Corporation, Armonk, NY (US)

( * ) Notice: Subject to any disclaimer, the term of this patent is extended or adjusted under 35 U.S.C. 154(b) by 1520 days.

(21) Appl. No.: 12/325,389

(22) Filed: Dec. 1, 2008

(65) Prior Publication Data
US 2010/0134619 A1 Jun. 3, 2010

(51) Int. Cl.
*H04N 7/18* (2006.01)
*G06Q 10/04* (2012.01)
*G06Q 10/06* (2012.01)
*G08B 13/196* (2006.01)

(52) U.S. Cl.
CPC .......... *G06Q 10/04* (2013.01); *G06Q 10/06393* (2013.01); *G08B 13/19602* (2013.01)

(58) Field of Classification Search
CPC ...... G08B 13/196; G08B 13/00; G08B 29/00; G08B 27/00; G08B 7/00; G08B 13/19645; G08B 13/19693; G08B 21/06
USPC ....................................................... 348/143
See application file for complete search history.

(56) References Cited

U.S. PATENT DOCUMENTS

| | | | |
|---|---|---|---|
| 4,979,137 A * | 12/1990 | Gerstenfeld et al. | 703/8 |
| 5,595,488 A * | 1/1997 | Gozlan et al. | 434/236 |
| 5,682,882 A | 11/1997 | Lieberman | |
| 5,977,872 A * | 11/1999 | Guertin | 340/515 |
| 6,614,348 B2 | 9/2003 | Ciccolo et al. | |
| 6,899,540 B1 * | 5/2005 | Neiderman et al. | 434/219 |
| 6,985,079 B1 | 1/2006 | Pinter et al. | |
| 7,158,022 B2 * | 1/2007 | Fallon | 340/506 |
| 7,452,336 B2 | 11/2008 | Thompson | |
| 2005/0015744 A1 * | 1/2005 | Bushey et al. | 717/104 |
| 2006/0190228 A1 * | 8/2006 | Johnson | 703/13 |
| 2006/0220796 A1 * | 10/2006 | Pinter et al. | 340/286.02 |
| 2006/0236357 A1 * | 10/2006 | Walker et al. | 725/105 |
| 2006/0239546 A1 * | 10/2006 | Tedesco et al. | 382/159 |
| 2007/0008408 A1 * | 1/2007 | Zehavi | 348/143 |
| 2008/0133190 A1 * | 6/2008 | Peretz et al. | 703/6 |
| 2008/0170660 A1 * | 7/2008 | Gudmundson et al. | 378/57 |

(Continued)

OTHER PUBLICATIONS

Andrew Tanenbaum, Structured computer organization; (2nd ed.), Prentice-Hall, Inc., Upper Saddle River, NJ, 1984.*

(Continued)

*Primary Examiner* — June Sison
(74) *Attorney, Agent, or Firm* — Matthew Chung; Keohane & D'Alessandro PLLC; Madeline F. Schiesser

(57) ABSTRACT

An approach that evaluates an effectiveness of a monitoring system is provided. In one embodiment, there is a performance evaluation tool, including an evaluation component configured to receive visual media at a monitoring system monitored by a set of users, and evaluate a monitoring performance of the set of users in response to a simulated alert within the visual media. The performance evaluation tool further comprises an analysis component configured to predict an effectiveness of the monitoring system based on the performance of the set of users in response to the simulated alert within the visual media.

17 Claims, 4 Drawing Sheets

(56) References Cited

U.S. PATENT DOCUMENTS

| | | | |
|---|---|---|---|
| 2008/0201116 A1* | 8/2008 | Ozdemir et al. | 703/2 |
| 2008/0201277 A1* | 8/2008 | Ozdemir et al. | 706/11 |
| 2009/0172183 A1* | 7/2009 | Derksen et al. | 709/232 |
| 2009/0300097 A1* | 12/2009 | Meyer | 709/203 |
| 2010/0083375 A1* | 4/2010 | Friedman et al. | 726/22 |
| 2011/0001657 A1* | 1/2011 | Fox et al. | 342/107 |

OTHER PUBLICATIONS

Steve McConnell, "Who Needs Software Engineering?," IEEE Software, vol. 18, No. 1, pp. 5-8, Jan./Feb. 2001, doi:10.1109/MS.2001.903148.*

Frank Vahid, "The Softening of Hardware," Computer, vol. 36, No. 4, pp. 27-34, Apr. 2003, doi:10.1109/MC.2003.1193225.*

* cited by examiner

EVALUATING AN EFFECTIVENESS OF A MONITORING SYSTEM

FIELD OF THE INVENTION

The present invention generally relates to visual monitoring or surveillance systems. Specifically, the present invention provides a way to evaluate user performance of a monitoring system.

BACKGROUND OF THE INVENTION

Today, virtually every municipality, agency, educational institution, mass transportation center, financial institution, utility plant and medical center uses video surveillance to protect property, employees, customers, citizens and information technology (IT) infrastructure. Likewise, visual monitoring systems, in general, are increasingly prolific, tracking the behavior or processes, such as nuclear power plants, babies in intensive care, and remote tele-operation environments. However, the performance and effectiveness of video surveillance systems may vary widely depending on a number of factors. Current methods for evaluating surveillance systems typically focus on the performance of individual alert algorithms, measuring, for example, their precision and recall. Measuring individual alert algorithms does not provide adequate insight into the effectiveness of these alerts on human detection, recognition, and performance. One prior art alternative to pure algorithm-measurement is to measure the effectiveness of the whole system, including the human monitor, using a panel of human judges. Even with a panel of judges, however, no methodology exists to develop a set of conditions that would serve to test the system.

SUMMARY OF THE INVENTION

In one embodiment, there is a method for evaluating an effectiveness of a monitoring system. In this embodiment, the method comprises: receiving visual media at a monitoring system monitored by a set of users; evaluating a monitoring performance of the set of users in response to a simulated alert within the visual media; and predicting an effectiveness of the monitoring system based on the performance of the set of users in response to the simulated alert within the visual media.

In a second embodiment, there is a system for evaluating an effectiveness of a monitoring system. In this embodiment, the system comprises at least one processing unit, and memory operably associated with the at least one processing unit. A performance evaluation tool is storable in memory and executable by the at least one processing unit. The performance evaluation tool comprises: an evaluation component configured to receive visual media at a monitoring system monitored by a set of users, and evaluate a monitoring performance of the set of users in response to a simulated alert within the visual media. The performance evaluation tool further comprises an analysis component configured to predict an effectiveness of the monitoring system based on the performance of the set of users in response to the simulated alert within the visual media.

In a third embodiment, there is a computer-readable medium storing computer instructions, which when executed, enables a computer system to evaluate an effectiveness of a monitoring system, the computer instructions comprising: receiving visual media at a monitoring system monitored by a set of users; evaluating a monitoring performance of the set of users in response to a simulated alert within the visual media; and predicting an effectiveness of the monitoring system based on the performance of the set of users in response to the simulated alert within the visual media.

In a fourth embodiment, there is a method for deploying a performance evaluation tool for use in a computer system that provides evaluation of an effectiveness of a monitoring system. In this embodiment, a computer infrastructure is provided and is operable to: receive visual media at a monitoring system monitored by a set of users; evaluate a monitoring performance of the set of users in response to a simulated alert within the visual media; and predict an effectiveness of the monitoring system based on the performance of the set of users in response to the simulated alert within the visual media.

Figure 1:
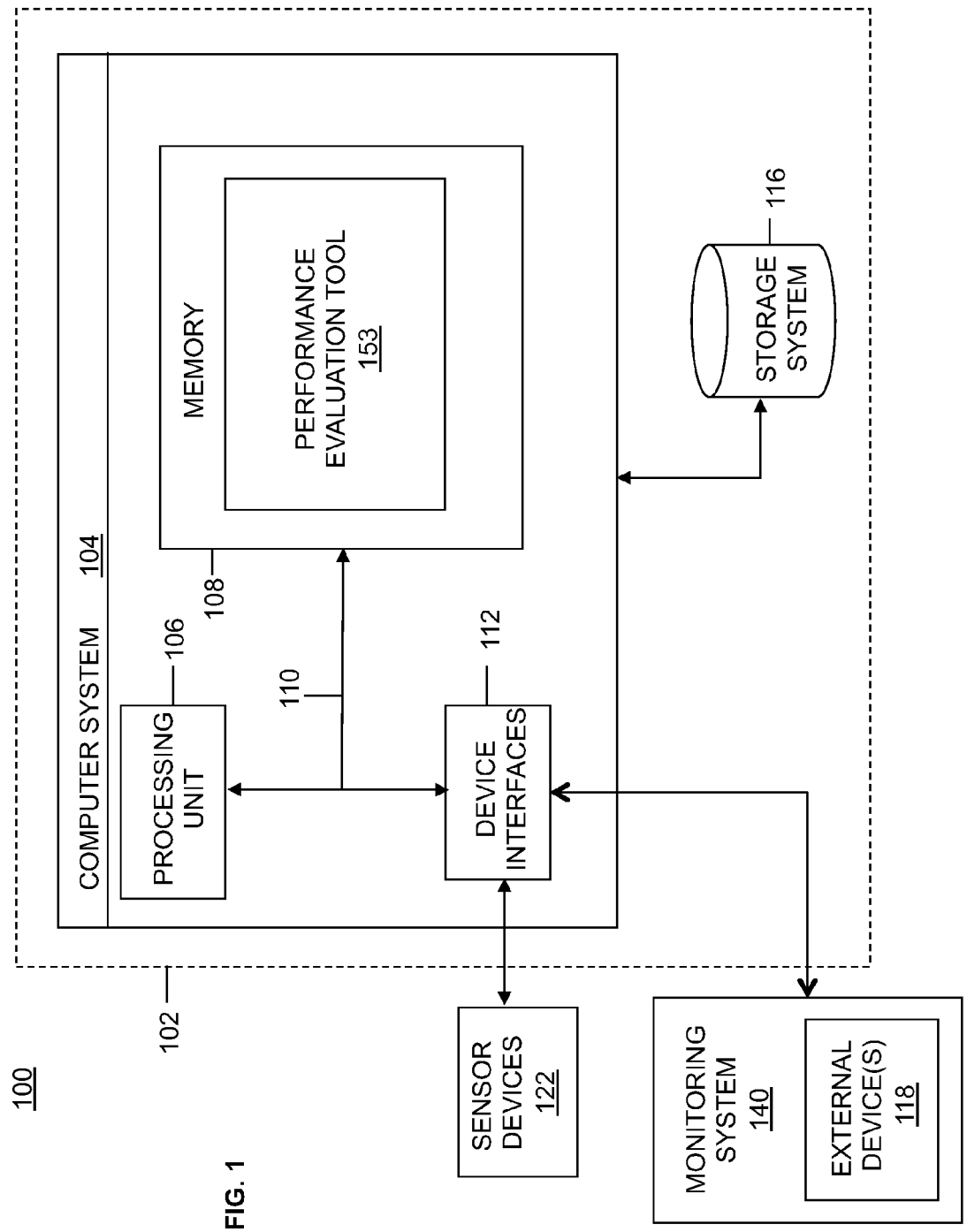
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to evaluating the effectiveness of a monitoring system based on the impact of surveillance algorithm characteristics (e.g., precision or recall), or methodologies for displaying algorithm characteristics (e.g., visual, auditory or tactile dimensions) on human performance. In these embodiments, a performance evaluation tool provides this capability. Specifically, the performance evaluation tool comprises: an evaluation component configured to receive visual media (e.g., a surveillance video) at a monitoring system monitored by a set of users, and evaluate a monitoring performance of the set of users in response to a simulated alert within the visual media. The performance evaluation tool further comprises an analysis component configured to predict an effectiveness of the monitoring system based on the performance of the set of users in response to the simulated alert within the visual media. In doing so, the present invention benchmarks monitoring systems not only in terms of algorithm performance, but also in terms of the impact of algorithm characteristics on human performance (e.g., vigilance, attention, fatigue, interest, etc.).

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system.

In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for evaluating the effectiveness of a monitoring system. It should be understood that any other computers implemented under the present invention may have different components/software, but will perform similar functions. As shown, computer system 104 includes a processing unit 106 capable of analyzing sensor data, and producing a usable output, e.g., visual media (i.e., compressed video) and video meta-data. Also shown is memory 108 for storing a performance evaluation tool 153, a bus 110, and device interfaces 112.

Computer system 104 is shown communicating with a set (i.e., one or more) of sensor devices 122 that communicate with bus 110 via device interfaces 112. Sensor devices 122 include one or more sensor devices for capturing image data representing visual attributes of objects (e.g., people, products, vehicles etc.) within region of interest 119. Sensor device 122 can include virtually any type of sensor capable of capturing visual attributes of objects, such as, but not limited to: optical sensors, infrared detectors, thermal cameras, still cameras, analog video cameras, digital video cameras, or any other similar device that can generate sensor data of sufficient quality to support the methods of the invention as described herein.

Processing unit 106 collects and routes signals representing outputs from sensor devices 122 to performance evaluation tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)). In some embodiments, POS 115 and sensor devices 122 are capable of two-way communication, and thus can receive signals (to power up, to sound an alert, etc.) from performance evaluation tool 153.

In general, processing unit 106 executes computer program code, such as program code for operating performance evaluation tool 153, which is stored in memory 108 and/or storage system 116. While executing computer program code, processing unit 106 can read and/or write data to/from memory 108 and storage system 116. Storage system 116 stores sensor data, including video metadata generated by processing unit 106, as well as rules against which the metadata is compared to identify objects and attributes of objects present within region of interest 119. Storage system 116 can include VCRs, DVRs, RAID arrays, USB hard drives, optical disk recorders, flash storage devices, image analysis devices, general purpose computers, video enhancement devices, de-interlacers, scalers, and/or other video or data processing and storage elements for storing and/or processing video. The video signals can be captured and stored in various analog and/or digital formats, including, but not limited to, Nation Television System Committee (NTSC), Phase Alternating Line (PAL), and Sequential Color with Memory (SECAM), uncompressed digital signals using DVI or HDMI connections, and/or compressed digital signals based on a common codec format (e.g., MPEG, MPEG2, MPEG4, or H.264).

Although not shown, computer system 104 could also include I/O interfaces that communicate with one or more external devices 118 (e.g., a keyboard, a pointing device, a display, etc.) at a monitoring system 140 that enable a user to interact with monitoring system 140 and computer system 104.

Figure 2:
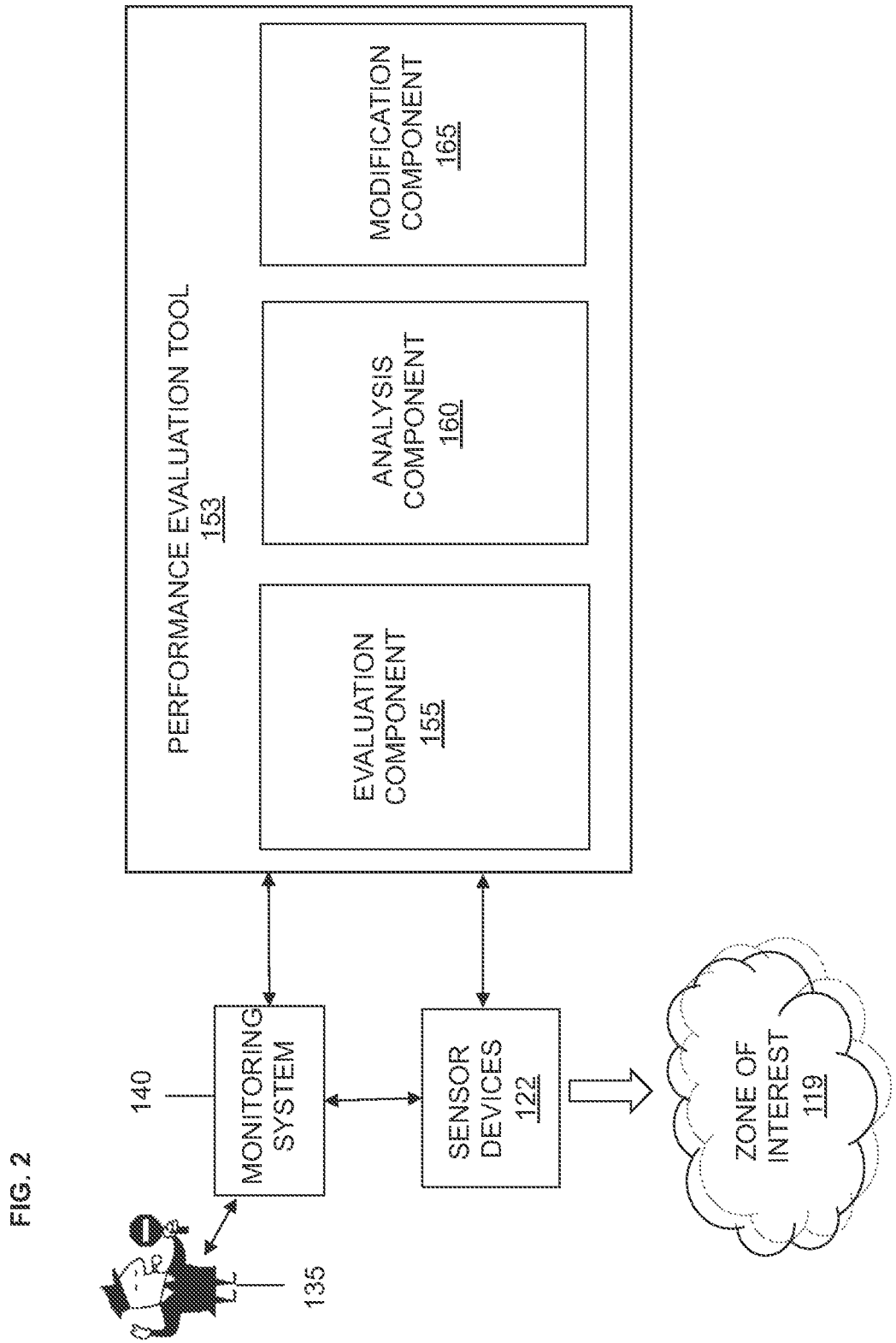
FIG. 2 shows a performance evaluation tool that operates in the environment shown in FIG. 1.
Figure 3:
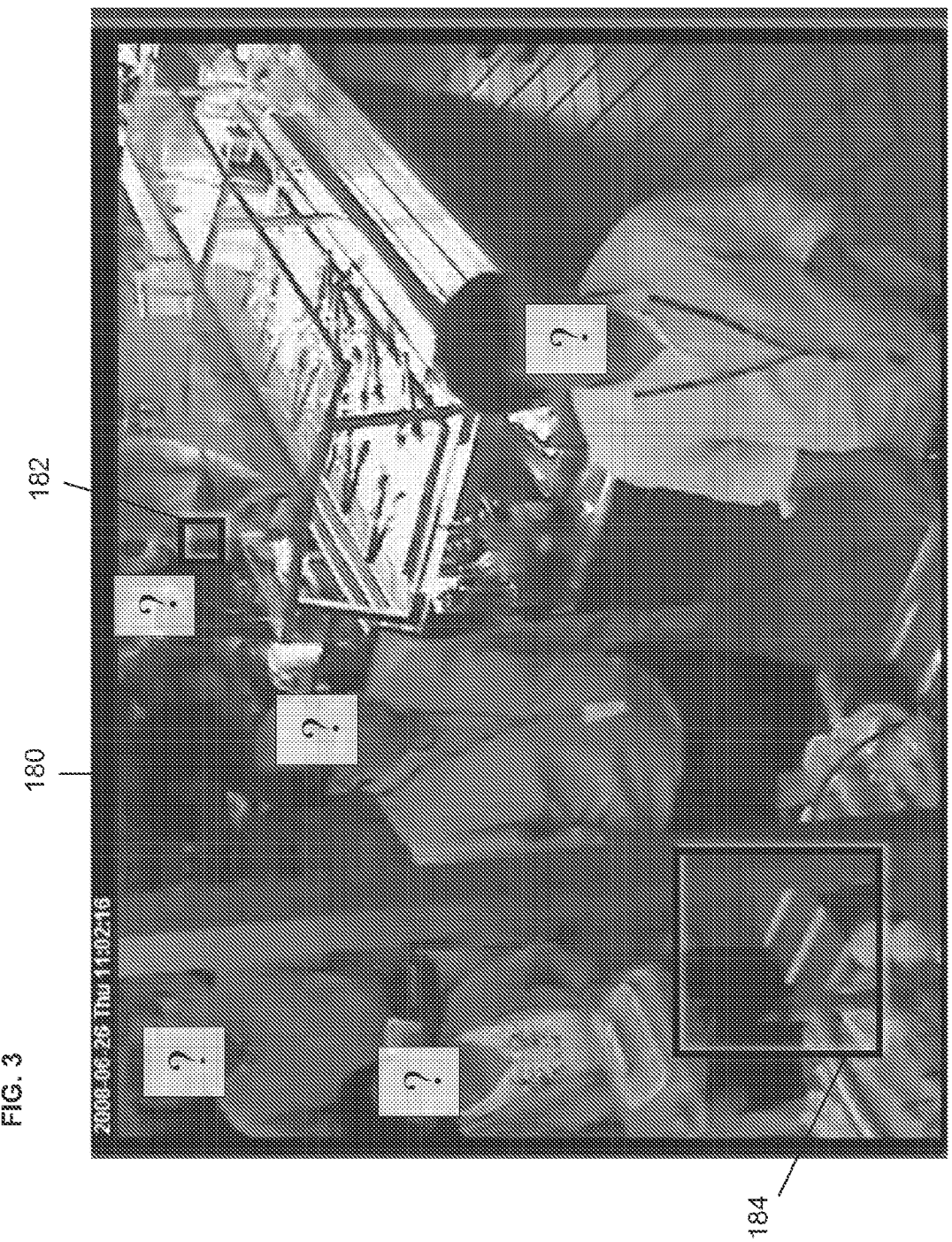
FIG. 3 shows an exemplary region of interest that is monitored by a monitoring system according to embodiments of the invention.

FIGS. 2-3 show a more detailed view of performance evaluation tool 153 according to embodiments of the invention. As shown, performance evaluation tool 153 comprises an evaluation component 155 configured to receive visual media (e.g., continuous surveillance video feeds, surveillance video snapshots, etc.) at monitoring system 140 monitored by a set (i.e., one or more) of users 135. Evaluation component 155 processes visual media from sensor devices 122 in real-time, identifying events, objects, and attributes of objects that are detected in region of interest 119. In one embodiment, in which video sensor data is received from a digital video camera, evaluation component 155 uploads messages in extensible mark-up language (XML) to a data repository, such as storage system 116 (FIG. 1). Evaluation component 155 provides the software framework for hosting a wide range of video analytics to accomplish this. The video analytics are intended to detect and track a person and/or a plurality of objects moving across a video image and perform an analysis of all characteristics associated with each object in region of interest 119. The set of moving objects can be detected using a number of approaches, including but not limited to: background modeling, object detection and tracking, spatial intensity field gradient analysis, diamond search block-based (DSBB) gradient descent motion estimation, or any other method for detecting and identifying objects and events captured by a sensor device.

During operation, sensor devices 122 monitor objects within region of interest 119 for the purpose of identifying and recording any number of target events, which may be events of importance in a video surveillance setting (e.g., security breaches, persons entering/exiting the region of interest, detection of various objects, etc.). Generally, upon detection of a target event, an alert is triggered and conveyed to a user (e.g., security personnel) to notify the user of the target event. Depending on the type of monitoring system employed, the alert may take on any number of forms designed to invoke a response from the user, as will be described in further detail below.

To test an overall effectiveness of algorithm-driven alerts generated by monitoring system 140, evaluation component 155 is configured to evaluate a monitoring performance of set of users 135 in response to a simulated alert within the visual media received at monitoring system 140. To accomplish this, evaluation component 155 is configured to establish a set of benchmark test cases each containing at least one simulated alert having at least one characteristic. The benchmark test cases may comprise a series of different alert types generated within the same video sequence or simulated test scenario, each of the alerts being dynamically created within the visual media at run-time. For example, if a person is detected passing through an entry point, a first benchmark test case may include a simulated alert having an audio characteristic (e.g., a loud beep), while a second benchmark test case may include a simulated alert with a haptic characteristic (e.g., a vibrating "mouse"). Each benchmark test case may be stored within storage system 116 (FIG. 1) for later comparison/evaluation.

Evaluation component 155 is configured to evaluate an ability of set of users 135 to respond to the set of benchmark test cases. For example, evaluation component 155 may record a user's response to measure accuracy and average response time in identifying objects and events within region of interest 119. In this way, a series of benchmark test cases can be defined for monitoring the user's performance in response to each different type of simulated alert (e.g., audio, visual, haptic, etc.). In another example, evaluation component 155 evaluates the probability of alert occurrence relative to an event, simulating the monitoring systems' "hit" and "false alarm" rate related to the recall and precision of the algorithm.

The recorded human responses to the controlled benchmark test cases are then used to predict a future performance of monitoring system 140. As shown in FIG. 2, performance evaluation tool 153 comprises an analysis component 160 configured to predict an effectiveness of monitoring system 140 based on the performance of set of users 135 in response to the simulated alert(s) within the visual media. For example, analysis component 160 may determine that it takes a specific user a certain period of time to recognize a visual simulated alert presented on a display 180 (FIG. 3) at monitoring system 140. However, this period of time may be unacceptable for efficient monitoring when compared against predefined and/or dynamic criteria.

In one embodiment, analysis component 160 receives modification information messages corresponding to different simulated alert characteristics, as determined by the requirements of the benchmark test cases. A non-limiting list of characteristics of the simulated alert includes: spatial characteristics (e.g., size, shape, or color of a visual alert), auditory characteristics, temporal characteristics (duration and animation), haptic characteristics, visual labels associated with modification information messages, or a probability of an alert occurring in response to the target event (i.e., simulating accuracy of the alert.) At least one of these alert characteristics are dynamically generated at run-time by evaluation component 155, wherein the modifications may include, but are not limited to: alert size scaled based on distance from video camera, alert color based on background color(s) within the region of interest, alert presence or absence depending on precision/recall condition (e.g., if 70% alerts, 30% are not displayed at run-time), alert characteristics based on alert algorithm confidence, audio characteristics based on biofeedback from user (e.g., if user is asleep), or alert characteristic having a semantic meaning (e.g., smoking indicating a fire, breaking glass indication an intrusion, etc.). However, it will be appreciated that many other modifications with the goal of dynamically measuring or improving user response to a simulated alert are possible within the scope of the invention.

Referring now to FIG. 3, an exemplary region of interest depicted on display 180 (e.g., a graphical user interface) that is monitored by a monitoring system according to embodiments of the invention will be described in further detail. In this case, the region of interest is a check-out area of a cafeteria, having people and objects typically found in such a setting. Security personnel may be monitoring the region of interest, as well as other regions, using display 180 at a remote monitoring system. As shown, simulated alerts 182 and 184 have been generated at run-time based on a set of benchmark test cases designed to evaluate human response to alerts while monitoring the cafeteria check-out area. In this exemplary embodiment, visual tags (i.e., boxes corresponding to simulated alerts 182 and 184) have been added to the visual media at run-time according to the relative distance from the camera delivering the visual media presented on display 180. Here, a target event corresponding to simulated alert 184 occurs closer to the camera than a target event corresponding to simulated alert 182. By providing varying alert sizes, security personnel may be able to gain more meaningful information from the alerts to more accurately and efficiently detect the location of target events. For example, based on the alert size, security personnel can quickly determine an appropriate camera zoom amount to effectively monitor each target event. It will be appreciated that simulated alerts 182 and 184 shown in FIG. 3 are exemplary of one possible type of alert, and that other alert characteristics can be modified within the scope of the present invention to dynamically create a variety of modified alerts for increased effectiveness of the monitoring system.

As discussed herein, the present invention embeds simulated alerts into a surveillance or monitoring system in a way that allows different alert parameters to be manipulated under controlled conditions to test users' performance with respect to these simulated alert parameters. These parameters may reflect the characteristics of a real, operational system, or may reflect characteristics under consideration for future designs. The present invention also provides a systematic way of collecting and analyzing user judgments so that performance on the task can be used, with confidence, to predict user performance in the real system, and thereby provide a measure of system quality.

It can be appreciated that the methodologies disclosed herein can be used within a computer system to evaluate an effectiveness of a monitoring system, as shown in FIG. 1. In this case, performance evaluation tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 4:
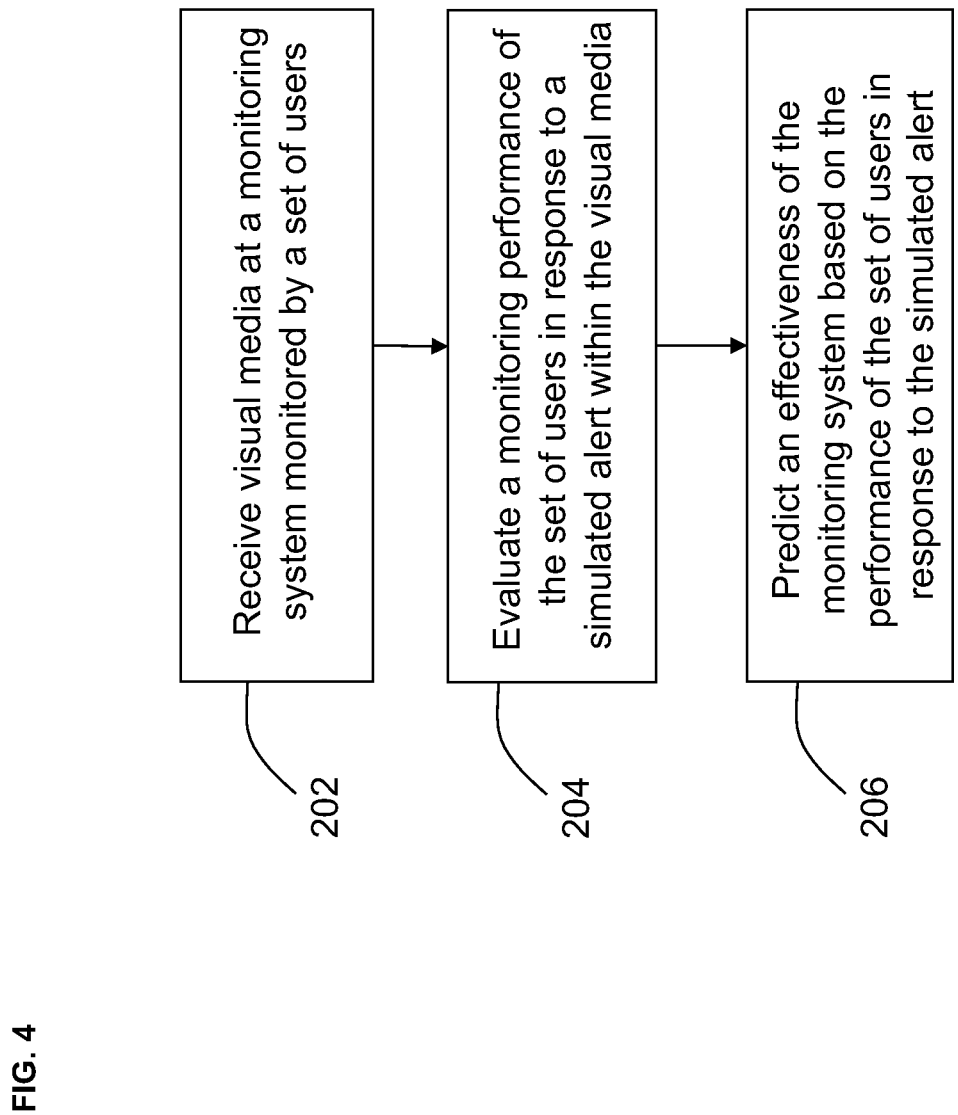
FIG. 4 shows a flow diagram of an approach for evaluating an effectiveness of a visual surveillance system according to embodiments of the invention.

The program modules carry out the methodologies disclosed herein, as shown in FIG. 4. According to one embodiment, at 202, visual media (i.e., sensor video input data) from a region of interest is received at a monitoring system monitored by a set of users. At 204, a monitoring performance of the set of users in response to an alert within the visual media is evaluated. At 206, an effectiveness of the monitoring system based on the performance of the set of users in response to the alert is predicted.

The flowchart of FIG. 4 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Furthermore, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for evaluating an effectiveness of a monitoring system. While the invention has been particularly shown and described in conjunction with a preferred embodiment thereof, it will be appreciated that variations and modifications will occur to those skilled in the art. For example, the present invention can be applied generally to stimuli generated by a system that is user controlled/monitored. In one case, the present invention can be used to measure user response to cellular telephone response stimuli (e.g., ringtones, vibrations). A set of test cases may be developed and observed, and the effectiveness of the algorithm for alerting a user to an incoming cellular telephone communication is predicted. Therefore, it is to be understood that the appended claims are intended to cover all such modifications and changes that fall within the true spirit of the invention.

What is claimed is:

1. A method for evaluating an effectiveness of a monitoring system, comprising:

receiving, via at least one computing device, visual media at a monitoring system monitored by a set of users;

generating, via at least one computing device, a plurality of benchmark test cases for a same detected event captured within a same video sequence of the visual media, each of the plurality of benchmark test case comprising a different simulated visual alert generated in response to the detected event and displayed within the same video sequence of the visual media to indicate to the set of users an occurrence of the detected event;

evaluating, via at least one computing device, a monitoring performance of the set of users in response to each of the plurality of benchmark test; and predicting, via at least one computing device, an effectiveness of the monitoring system based on the performance of the set of users in response to each of the plurality of benchmark test cases;

the different simulated visual alert comprising a visual tag sized according to the relative distance between the same detected event and a camera receiving the visual media, wherein the visual tag increases in size as the distance decreases between the same detected event and the camera receiving the visual media.

2. The method according to claim 1, the evaluating further comprising:

dynamically creating, via at least one computing device, the simulated alert within the visual media at run-time.

3. The method according to claim 2, the evaluating comprising evaluating, via at least one computing device, an ability of the set of users to respond to the plurality of benchmark test cases.

4. The method according to claim 2, wherein the at least one characteristic of the simulated alert comprises at least one of the following: spatial characteristics, auditory characteristics, temporal characteristics, or haptic characteristics.

5. A system for evaluating an effectiveness of a monitoring system comprising:

at least one processing unit;

memory operably associated with the at least one processing unit; and a performance evaluation tool storable in memory and executable by the at least one processing unit to cause the system to:

receive visual media at a monitoring system monitored by a set of users;

generate a plurality of benchmark test cases for a same detected event captured within a same video sequence of the visual media, each of the plurality of benchmark test case comprising a different simulated visual alert generated in response to the detected event and displayed within the same video sequence of the visual media to indicate to the set of users an occurrence of the detected event; and predict an effectiveness of the monitoring system based on the performance of the set of users in response to each of the plurality of benchmark test cases;

the different simulated visual alert comprising a visual tag sized according to the relative distance between the same detected event and a camera receiving the visual media, wherein the visual tag increases in size as the distance decreases between the same detected event and the camera receiving the visual media.

6. The performance evaluation tool according to claim 5, further executed to cause the system to:
dynamically create the simulated alert within the visual media at run-time.

7. The performance evaluation tool according to claim 6, further executed to cause the system to evaluate an ability of the set of users to respond to the plurality of benchmark test cases.

8. The performance evaluation tool according to claim 6, the at least one characteristic of the simulated alert comprising at least one of the following: spatial characteristics, auditory characteristics, temporal characteristics, or haptic characteristics.

9. A non-transitory computer-readable medium storing computer instructions, which when executed, enables a computer system to evaluate an effectiveness of a monitoring system, the computer instructions comprising:
receiving visual media at a monitoring system monitored by a set of users;
generating a plurality of benchmark test cases for a same detected event captured within a same video sequence of the visual media, each of the plurality of benchmark test case comprising a different simulated visual alert generated in response to the detected event and displayed within the same video sequence of the visual media to indicate to the set of users an occurrence of the detected event;
evaluating a monitoring performance of the set of users in response to each of the plurality of benchmark test cases; and
predicting an effectiveness of the monitoring system based on the performance of the set of users in response to each of the plurality of benchmark test cases;
the different simulated visual alert comprising a visual tag sized according to the relative distance between the same detected event and a camera receiving the visual media, wherein the visual tag increases in size as the distance decreases between the same detected event and the camera receiving the visual media.

10. The non-transitory computer-readable medium according to claim 9, the computer instructions for evaluating further comprising:
dynamically creating the simulated alert within the visual media at run-time.

11. The non-transitory computer-readable medium according to claim 10, the computer instructions for evaluating further comprising evaluating an ability of the set of users to respond to the plurality of benchmark test cases.

12. The non-transitory computer-readable medium according to claim 10, wherein the at least one characteristic of the simulated alert comprises at least one of the following: spatial characteristics, auditory characteristics, temporal characteristics, or haptic characteristics.

13. A method for deploying a performance evaluation tool for use in a computer system that evaluates an effectiveness of a monitoring system, the method comprising the computer implemented steps to:
receive visual media at a monitoring system monitored by a set of users;
generate a plurality of benchmark test cases for a same detected event captured within a same video sequence of the visual media, each of the plurality of benchmark test case comprising a different simulated visual alert generated in response to the detected event and displayed within the same video sequence of the visual media to indicate to the set of users an occurrence of the detected event;
evaluate a monitoring performance of the set of users in response to each of the plurality of benchmark test cases; and
predict an effectiveness of the monitoring system based on the performance of the set of users in response to each of the plurality of benchmark test cases;
the different simulated visual alert comprising a visual tag sized according to the relative distance between the same detected event and a camera receiving the visual media, wherein the visual tag increases in size as the distance decreases between the same detected event and the camera receiving the visual media.

14. The method according to claim 13, the computer-implemented step to evaluate further comprising:
dynamically creating the simulated alert within the visual media at run-time.

15. The method according to claim 14, the computer-implemented step to evaluate further comprising evaluating an ability of the set of users to respond to the plurality of benchmark test cases.

16. The method according to claim 14, wherein the at least one characteristic of the simulated alert comprises at least one of the following: spatial characteristics, auditory characteristics, temporal characteristics, or haptic characteristics.

17. The method according to claim 1, wherein the different simulated alert has a color selected based on a set of background colors within a region of interest.

* * * * *